United States Patent
Meeusen et al.

(10) Patent No.: US 11,913,451 B2
(45) Date of Patent: Feb. 27, 2024

(54) SCREW COMPRESSOR INCLUDING SPOKED GEAR

(71) Applicant: ATLAS COPCO AIRPOWER, NAAMLOZE VENNOOTSCHAP, Wilrijk (BE)

(72) Inventors: Wim Meeusen, Wilrijk (BE); Bjorn Verrelst, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 72 days.

(21) Appl. No.: 16/620,922

(22) PCT Filed: Jul. 17, 2018

(86) PCT No.: PCT/IB2018/055268
§ 371 (c)(1),
(2) Date: Dec. 10, 2019

(87) PCT Pub. No.: WO2019/043469
PCT Pub. Date: Mar. 7, 2019

(65) Prior Publication Data
US 2020/0200171 A1    Jun. 25, 2020

Related U.S. Application Data

(60) Provisional application No. 62/550,889, filed on Aug. 28, 2017.

(30) Foreign Application Priority Data

Mar. 13, 2018    (BE) .................................. 2018/5153

(51) Int. Cl.
*F04C 18/16*     (2006.01)
*F01C 17/02*     (2006.01)
(Continued)

(52) U.S. Cl.
CPC .......... *F04C 18/16* (2013.01); *F04C 29/0042* (2013.01); *F04C 29/005* (2013.01);
(Continued)

(58) Field of Classification Search
CPC .... F04C 18/16; F04C 29/005; F04C 29/0042; F04C 18/08; F04C 18/084; F04C 2240/40;
(Continued)

(56) References Cited

U.S. PATENT DOCUMENTS 1,211,229 A * 1/1917 Pruyn ...................... D21J 7/00
162/296
2,324,163 A * 7/1943 Philippe ................. G04B 1/225
185/38
(Continued)

FOREIGN PATENT DOCUMENTS

CN       202812067 U      3/2013
CN       205689723 U  *  11/2016
(Continued)

OTHER PUBLICATIONS

English Machine Translation of CN202812067U, translated by Espacenet. (Year: 2013).*
(Continued)

*Primary Examiner* — Dominick L Plakkoottam
*Assistant Examiner* — Paul W Thiede
(74) *Attorney, Agent, or Firm* — BACON & THOMAS, PLLC

(57) ABSTRACT

A screw compressor includes a first rotor and a second rotor, and each rotor is provided with a synchronisation gear. The screw compressor is further provided with an electric motor and one or two driving gears for driving the first rotor or second rotor. At least one of the synchronisation gears or
(Continued)

driving gears is provided with spokes between a rim supporting a gear mesh and a corresponding gear hub.

12 Claims, 3 Drawing Sheets

(51) Int. Cl.
  *F04C 18/08* (2006.01)
  *F04C 29/00* (2006.01)
  *F16H 55/14* (2006.01)
(52) U.S. Cl.
  CPC .............. *F01C 17/02* (2013.01); *F04C 18/08* (2013.01); *F04C 18/084* (2013.01); *F04C 2240/40* (2013.01); *F16H 55/14* (2013.01)
(58) Field of Classification Search
  CPC ........ F04C 27/009; F01C 17/02; F16H 55/14; F01L 1/024
  See application file for complete search history.

(56) References Cited

U.S. PATENT DOCUMENTS

| | | | | | |
|---|---|---|---|---|---|
| 2,452,777 | A | * | 11/1948 | Martinez | F16H 31/005 74/129 |
| 3,097,359 | A | * | 7/1963 | Cowles | F04C 18/16 418/203 |
| 3,371,549 | A | | 3/1968 | Schrempp | |
| 4,174,643 | A | * | 11/1979 | Tsukamoto | F16H 55/14 74/433.5 |
| 4,291,547 | A | * | 9/1981 | Leo | F04C 27/009 418/200 |
| 4,369,668 | A | * | 1/1983 | Pollak-Banda | F04D 29/051 74/410 |
| 4,704,864 | A | * | 11/1987 | Frotschner | F16H 41/24 474/195 |
| 6,073,517 | A | * | 6/2000 | Pauwels | F04C 29/06 74/606 R |
| 6,530,240 | B1 | * | 3/2003 | Kountz | F25B 1/047 62/611 |
| 6,694,587 | B2 | * | 2/2004 | Whitehead | B25B 27/0035 29/281.5 |
| 9,706,721 | B1 | * | 7/2017 | Hansen | B62D 55/24 |
| 11,067,082 | B2 | * | 7/2021 | Kikuchi | F04C 18/16 |
| 2006/0280626 | A1 | * | 12/2006 | Nishimura | F04C 18/16 417/410.4 |
| 2008/0146389 | A1 | * | 6/2008 | Sir | F01L 1/024 474/8 |
| 2009/0166034 | A1 | * | 7/2009 | Mundell | E21B 43/12 166/250.15 |
| 2011/0281682 | A1 | * | 11/2011 | Scekic | F16H 1/20 475/331 |
| 2012/0257997 | A1 | * | 10/2012 | Morita | F04C 27/009 417/415 |
| 2014/0130782 | A1 | * | 5/2014 | Bell | F04C 29/12 123/559.1 |
| 2016/0177951 | A1 | * | 6/2016 | Hauser | F04C 27/009 418/141 |
| 2017/0082108 | A1 | * | 3/2017 | Tsai | F04C 29/0007 |

FOREIGN PATENT DOCUMENTS

| | | | | | |
|---|---|---|---|---|---|
| GB | | 932015 | A | * | 7/1963 |
| GB | | 1378539 | | | 12/1974 |
| GB | | 2019493 | A | * | 10/1979 ............. F04C 28/08 |

OTHER PUBLICATIONS

English Machine Translation of CN205689723U, translated via USPTO PE2E Search Tool (FIT) (Year: 2016).*
International Search Report and Written Opinion in corresponding PCT Application No. PCT/IB2018/055268, dated Oct. 30, 2018.
1 Chinese Office Action in corresponding Chinese Application No. 201880045627.5, dated Mar. 9, 2023.

* cited by examiner

SCREW COMPRESSOR INCLUDING SPOKED GEAR

The present invention relates to a screw compressor.

BACKGROUND OF THE INVENTION

It is known that in oil-free screw compressor elements, the two rotors are driven at high-speed to minimise leakage and maximise compressed air output. The first rotor, either the male or female rotor, is driven and in turn drives the second rotor via two so-called synchronisation gears.

Most often, the first rotor is driven via a gearbox. When a conventional induction motor is used, with 1500 rpm, a gearbox with a large transmission ratio is necessary to realise the high-speed necessary to drive the oil-free screw compressor element. A gearbox with a large transmission ratio is big and expensive and generates considerable energy losses.

It is also possible to use a so-called direct drive, whereby the motor directly drives the oil-free screw compressor element. In that case an expensive motor control system is required and the losses associated with the high frequency switching necessary to control the motor at these high-speeds become considerable higher.

Therefore, it is cheaper and more energy efficient to use a high-speed motor with a small gearbox to drive the oil-free screw compressor element.

However, compared to the conventional solution with a big gearbox, using a high-speed motor with a small gearbox is more prone to vibration problems. With a big gearbox, the big bull gear of the gearbox, has a lot of inertia, and will prevent that vibrations that are for example generated in the oil-free screw compressor element propagate through the gearbox.

A solution to avoid the vibrations when using a high-speed motor with a small gearbox is already known, whereby use is made of a flexible coupling. This will not only facilitate alignment between the motor and the first rotor but will also provide damping of the vibrations.

However, these known installations show some drawbacks.

A drawback is that a flexible coupling is an extra cost and consequently the size of the gearbox also increases.

Furthermore, a flexible coupling is prone to wear and tear because the flexible material degrades over time, such that the flexible gearbox needs to be regularly replaced.

Furthermore, the damping of the flexible coupling absorbs a lot of energy reducing the energy efficiency of the gearbox.

U.S. Pat. No. 3,371,549 describes a gearwheel made from a thermoplastic material, such that it is deformable to allow the rim to be positioned eccentric relative to the hub. Although such gearwheel will be able to accommodate vibrations, it is much too weak to be applied in high-speed applications such as screw-type compressors.

U.S. Pat. No. 4,174,643 describes a gearwheel that is provided with brackets between the hub and the rim, whereby the space between the brackets is filled with a sound-damping material to absorb the sound coming from the resonance of the brackets.

SUMMARY OF THE INVENTION

The purpose of the present invention is to provide a solution to at least one of the aforementioned and other disadvantages by providing a gearbox for an oil-free screw compressor with a high-speed motor and a small gearbox which is more robust with respect to vibration problems.

The object of the present invention is a screw compressor comprising a first and a second rotor, each rotor being provided with a synchronisation gear, whereby the screw compressor is further provided with an electric motor and one or two driving gears for driving said first or second rotor, characterised in that at least one of the synchronisation gears or driving gears is provided with spokes between a rim supporting a gear mesh and a corresponding gear hub.

One advantage is that by providing at least one of the gears with spokes, the gearbox can be made more stable.

By using gears with spokes, the gear becomes more torsionally flexible, effectively preventing propagation of vibrations, especially torsional vibrations.

This is particularly important when gears with helical teeth are used, where there is a strong coupling between axial and torsional vibrations.

By mounting a gear according to the invention with spokes on the motor, the axial as well as the torsional vibrations on the motor and the rotors of the compressor can be reduced.

Gears with helical teeth are often preferred over gears with straight cut teeth because they show better running behaviour and because they can also transfer axial forces, which means they can be useful to improve the axial load in the bearings.

By adjusting the flexibility of the gear with spokes, the mode shape on the resonance of the drivetrain can be adjusted. In this way the nodes can be moved to places where the torsional vibrations can possibly excite the other degrees of freedom (axial and/or lateral). The position of the gear with spokes (link between torsional, axial and possible lateral movement) will then typically be an antinode for the torsional vibrations. Consequently, there is no torsional twist over the gearwheel and the axial or lateral movement is not excited by torsion vibrations.

By removing a flexible coupling the stiff drivetrain will become extremely sensitive for all kinds of tolerance errors of components placed on the different axes, among others the sizing of the gearwheel itself. By the reduced stiffness of the drivetrain via the gear spokes this sensitivity is strongly reduced and induced vibrations caused by these tolerance errors will be drastically reduced.

According to a preferred characteristic of the invention the synchronisation gear or driving gear with the largest diameter is provided with spokes between a rim supporting a gear mesh and a corresponding gear hub.

This has the advantage that the biggest and heaviest gearwheel cannot only be made much lighter thus also saving a lot of material, but also that the biggest gearwheel, which typically can accommodate the vibrations best, will be even more effective in accommodating vibrations by providing spokes.

BRIEF DESCRIPTION OF THE DRAWINGS

With the intention of better showing the characteristics of the invention, a few preferred embodiments of a screw compressor according to the invention are described hereinafter by way of an example, without any limiting nature, with reference to the accompanying drawings, wherein.

DETAILED DESCRIPTION OF THE INVENTION

Figure 1:
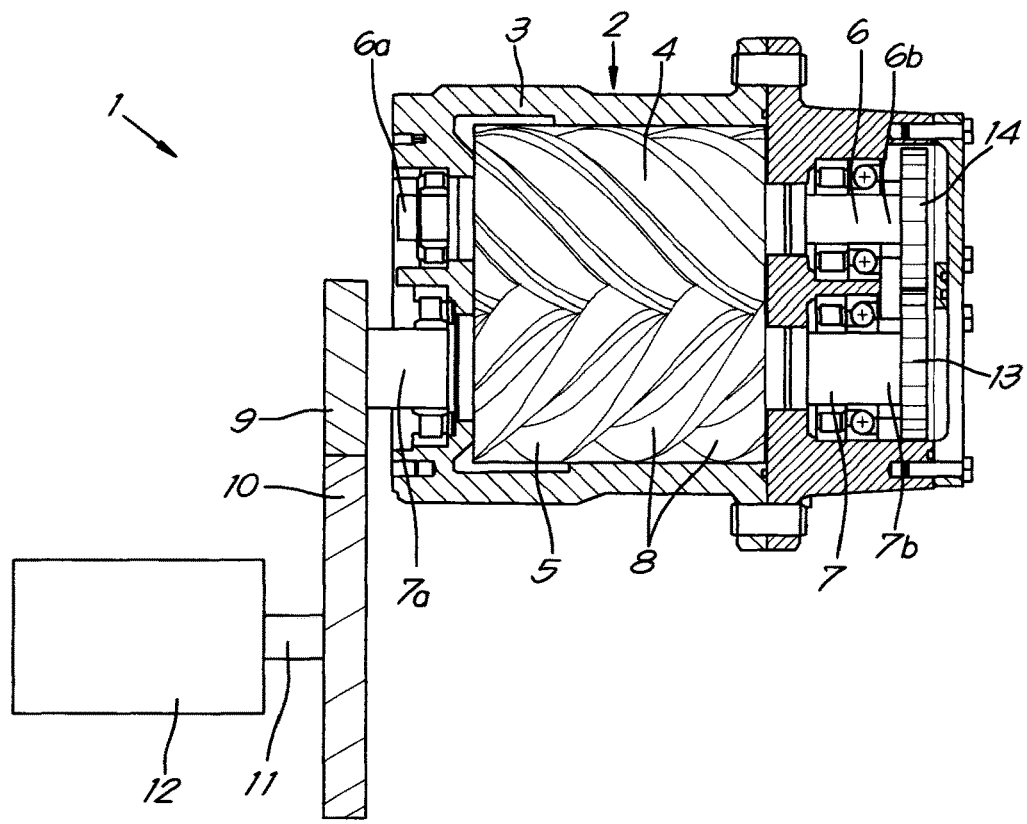
FIG. 1 schematically shows a screw compressor according to the invention.

FIG. 1 schematically shows a screw compressor 1 according to the invention which is provided with a compressor element 2.

The compressor element 2 comprises a housing 3 in which two rotors 4, 5 are mounted with bearings in their axes 6, 7. These rotors 4, 5 are so-called screw rotors, i.e. a male screw rotor 4 and a female screw rotor 5, with lobes 8 that can rotate co-operatively into each other.

For example, the male screw rotor 4 has five lobes 8 and the female screw rotor 5 three lobes 8.

It is of course possible that the rotors 4, 5 have a different number of lobes 8 or that the screw compressor 1 is provided with more than one such compressor elements.

At one end 7a of the axis 7 of one of the rotors 5 a first driving gear 9 is provided that can engage with a second driving gear 10, whereby this second driving gear 10 is mounted on the axis 11 of an electric motor 12. In this case the first driving gear 9 is mounted on the female screw rotor 5, but it can also be mounted on the male screw rotor 4.

The electric motor 12 is a high-speed motor, which can reach a rotational speed of at least 3000 rpm.

Because of this high-speed the second driving gear 10 on the electric motor 12 can have a smaller diameter than with an electric motor 12 with a rotational speed of for example maximum 1500 rpm. Moreover, consequently it is possible to ensure that the transmission ratio between the two driving gears 9, 10 is maximum six.

Further, at the other end 7b of the axis 7 of said female screw rotor 5 and at the corresponding end 6b of the axis 6 of the male screw rotor 4, a so-called synchronisation gear 13, 14 has been mounted.

As is clearly shown in FIG. 1, there is no elastic coupling between the electric motor 12 and the female screw rotor 5.

The transmission between the electric motor 12 and the female screw rotor 5 is completely ensured by the driving gears 9, 10.

In total, the screw compressor 1 comprises four gears: two driving gears 9, 10 and two synchronisation gears 13, 14.

Said driving gears 9 and 10 are typically provided with helical teeth 15 on their concerning rims 16. But embodiments are possible where they are provided with straight cut teeth.

Said synchronisation gears 13 and 14 are typically provided with straight cut teeth 15 on their concerning rims 16.

There can also be embodiments where helical teeth are provided for the synchronisation gears.

The so-called helix angle of these helical teeth has typical values between 20 to 35 degrees, but the invention is not limited to this range.

Figure 2:
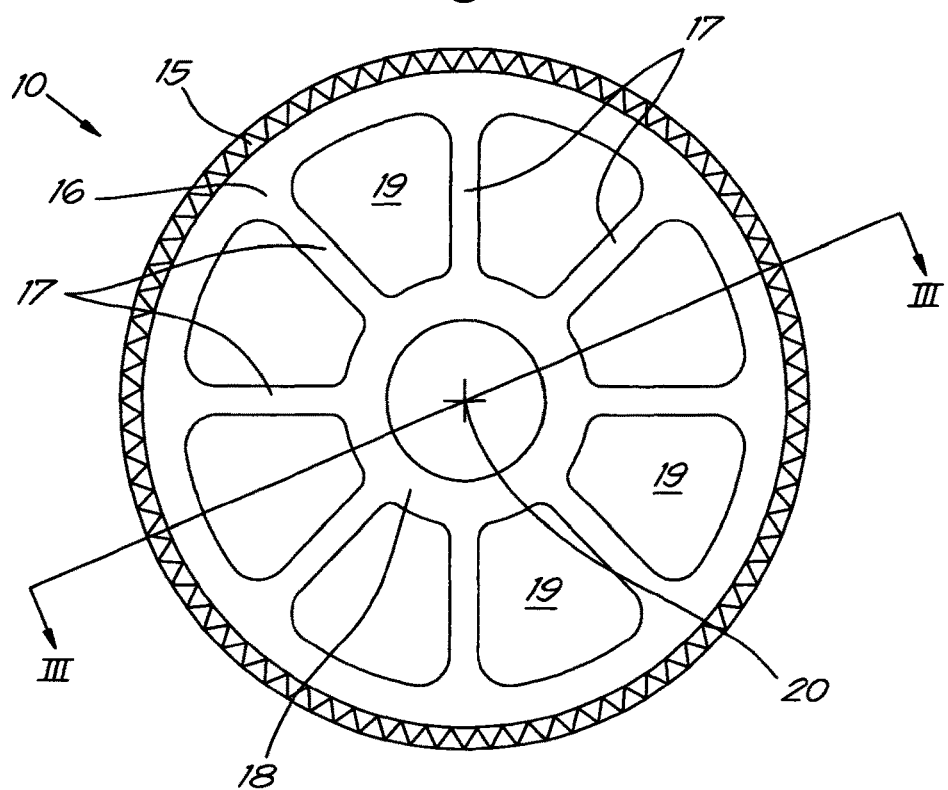
FIG. 2 shows the driving gear of the compressor device of FIG. 1.
Figure 3:
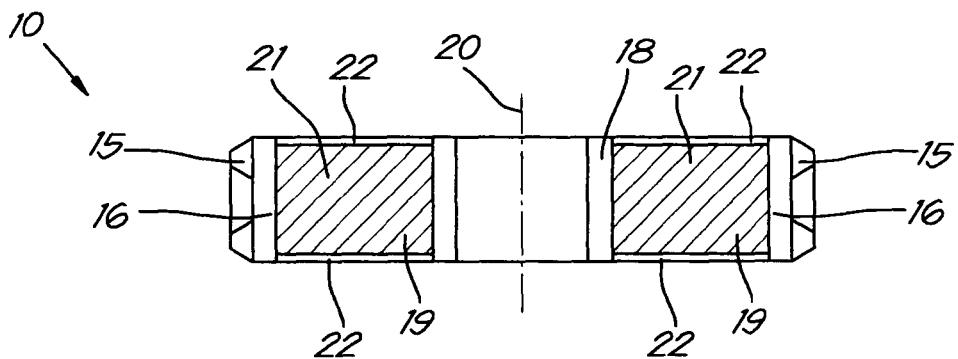
FIG. 3 shows a cross-section according to the line III-III in FIG. 2.

One of said driving gears 9, 10 is provided with spokes 17 as shown in FIGS. 2 and 3, which are mounted between the rim 16 supporting a gear mesh 15 and the gear hub 18 of the driving gear 9, 10.

In this case the second driving gear 10 mounted on the electric motor 12 is provided with such spokes 17. Naturally it is not excluded that another or several other gears 9, 13, 14 are provided with such spokes 17.

FIGS. 2 and 3 clearly show that the second driving gear 10 is provided with eight spokes 17 in this case which extend from the gear hub 18 to the rim 16. In this way the greatest common denominator of the number of spokes 17 and of the lobes 8 of the rotors 4, 5 equals one.

The spokes 17 in the shown example, however not necessarily for the invention, are beam-shaped and have a constant cross-section.

The surface of the space 19 between the spokes 17 is preferably more than three times, and even more preferably more than four times, and in this case even more than five times the surface of the spokes 17, as viewed along the axis 20 of the gear 10, i.e. as viewed in FIG. 2.

By leaving sufficient open space 19, a relatively 'weak' structure is obtained of the gearwheel 10 with a low stiffness or rigidity, such that the elastic deformability of the gear 10 increases.

In addition to the surface of the open space 19 the thickness of the spokes 17 is also decreased in relation to the gearwheel width such that the rigidity is lowered.

As shown in FIG. 3, the space 19 between the spokes 17 in this case is filled with a damping material 21.

This damping material 21 can for example be rubber based or more generally a kind of compound material whereby a rubber is used as binding agent.

A synthetic material, resin or metal mesh can also be used as damping material 21.

Although in the shown example all spaces 19 between the spokes 17 are filled with a damping material 21, this is not necessarily the case. One or more spaces 19 can also be empty or, for example, the spaces 19 can also be alternately filled with a damping material 21 and be empty.

The purpose of the damping material is then to increase the damping value in the drivetrain to further reduce the additional vibrations when the resonances are excited.

If the screw compressor 1 is provided with several gears 9, 10, 13, 14 with spokes 17, preferably in at least one gear 9, 10, 13, 14 with spokes 17 at least one of the spaces 19 between the spokes 17 is filled with a damping material 21. It needs to be noted that the material 21 can differ from gear to gear 9, 10, 13, 14 and possibly even from filled space 19 to filled space 19.

Additionally to the damping material 21, the spaces 19 between the spokes 17 are covered in the shown example. This is clearly visible in FIG. 3, where the spaces are covered with a plastic sheet 22 or cover, in order to keep the damping material 21 in the spaces 19.

Said sheets 22 or covers can be fixed between the spokes 17 with screws or the like or clicked tight by means of a click connection.

It is also possible that the spaces 19 between the spokes 17 are only covered, but not filled with damping material 21 such that empty chambers are created as it were.

It is also possible, just as with the damping material 21, that not all spaces 19 between the spokes 17 are covered.

The advantage of covering the empty spaces 19 is that when the gear 10 with spokes 17 is rotating, no unwanted swirls are created with associated losses, the so-called "winding losses".

Preferably, the gear 10 with spokes 17 is made of one piece of material.

The material from which the gear 10 with spokes 17 is made, can for example be steel or cast iron, but this is not necessary for the invention.

The operation of the screw compressor 1 is very simple and as follows.

In the known way the motor 12 will be able to drive the rotors 4, 5 of the screw compressor 1, whereby the rotation of the axis 11 of the electric motor 12 is transmitted via the second driving gear 10 to the first driving gear 9 on the axis 7 of the female screw rotor 5.

This rotation of the rotor 5 will make the corresponding synchronisation gear 13 rotate as well as the synchronisation gear 14, such that the male screw rotor 4 will also rotate.

During this operation of the screw compressor 1 gas can be compressed by the rotors 4, 5, whereby vibrations are generated in the compressor element 2.

The weakened second driving gear 10 will be able to reduce these vibrations by the uncoupling between the degrees of freedom on the one hand and by the possibly installed damping on the other hand, such that it is avoided that the unwanted vibrations that can propagate through the gearbox and, for example, damage the motor 12 or that the axial and/or lateral movement of the screw rotors 4, 5 themselves is not excited.

Figure 4:
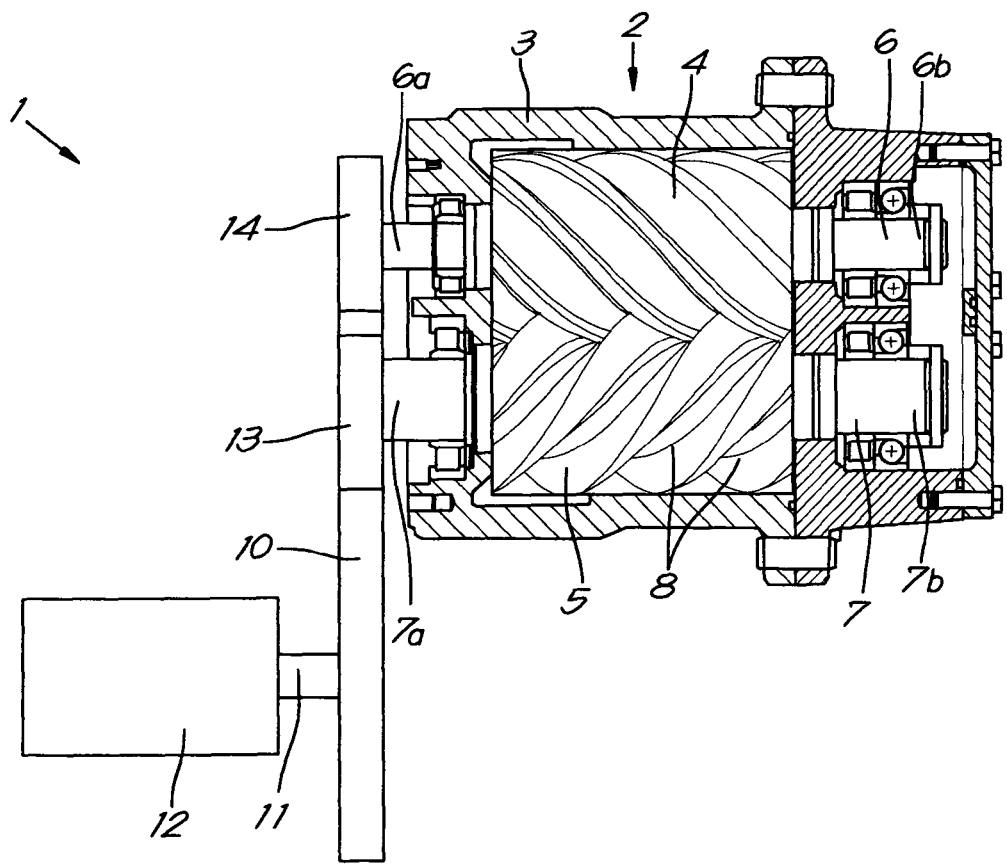
FIG. 4 schematically shows a variant of FIG. 1.

FIG. 4 shows a variant according to FIG. 1, whereby in this case the screw compressor 1 comprises only one second driving gear 10 to drive the rotor 5.

In this case the synchronisation gears 13, 14 are mounted on the other side of the rotors 4, 5 compared to FIG. 1, such that one of the synchronisation gears 13 also serves as driving gear 9.

Consequently, the screw compressor 1 in FIG. 4 is only provided with three gearwheels 10, 13, 14, whereby the transmission between the electric motor 12 and the driven rotor 5 is ensured by the second driving gear 10 and the synchronisation gear 13.

In this case the second driving gear 10 is also a gearwheel 10 with spokes 17, such as for example the gearwheel 10 in FIGS. 2 and 3.

For the rest the operation is analogue to the operation of the compressor device in FIG. 1.

Figure 5:
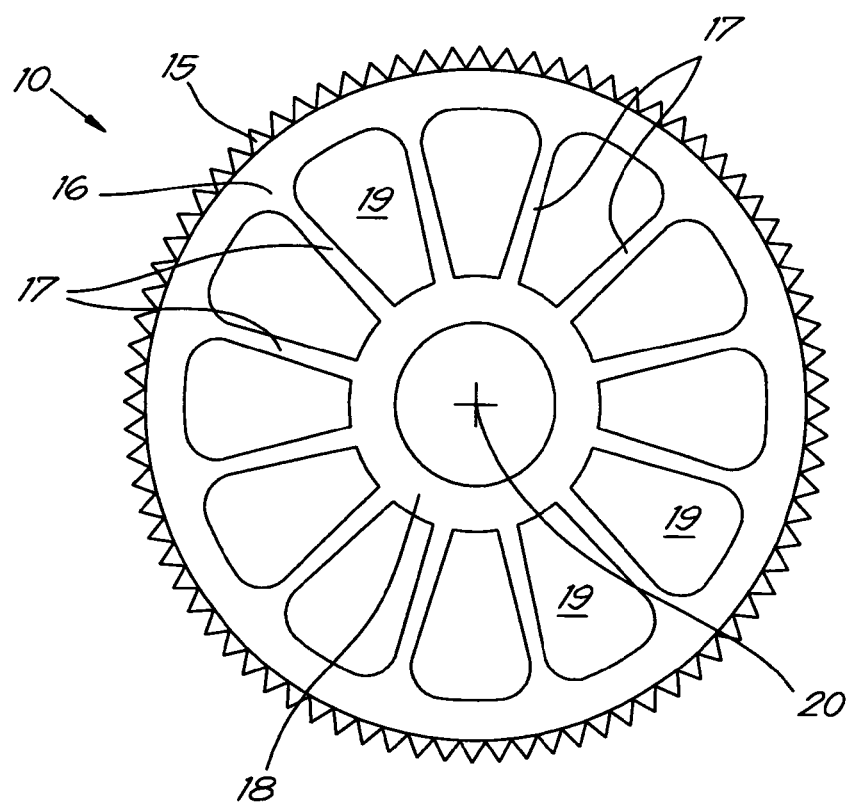
FIG. 5 schematically shows a variant of FIG. 2.

FIG. 5 shows an alternative embodiment of FIG. 1, whereby in this case the gearwheel 10 is provided with twelve spokes 17 between the gear hub 18 and the rim 16.

The spaces 19 between the spokes 17 are not filled or covered. The space 19 between the spokes 17 of the gearwheel 10 is open in other words.

The present invention is by no means limited to the embodiments described as an example and shown in the drawings, but a screw compressor 1 according to the invention can be realised in all kinds of forms and dimensions, without departing from the scope of the invention.

The invention claimed is:

1. A screw compressor comprising a first rotor and a second rotor, each rotor comprising a synchronisation gear, said screw compressor further provided with an electric motor and a driving gear for driving a driven gear provided on an axis of said first rotor or second rotor, wherein said driving gear is mounted on the electric motor, and said driving gear has a spoked structure having a plurality of spokes between a rim supporting a gear mesh and a corresponding gear hub,
wherein gear teeth of said driving gear mesh with gear teeth of said driven gear such that said driven gear is directly driven by said driving gear,
wherein an area of a region defined within the rim, the gear hub and two adjacent spokes is more than three times a surface area of one of the spokes as viewed along an axis of the driving gear, and
wherein said spoked structure of said driving gear provides a torsional flexibility to said driving gear which prevents propagation of vibrations to said driven gear.

2. The screw compressor according to claim 1, wherein the spokes are beam-shaped and have a constant cross-section.

3. The screw compressor according to claim 1, wherein the driving gear is made out of one piece of material.

4. The screw compressor according to claim 1, wherein the driving gear is made out of steel or cast iron.

5. The screw compressor according to claim 1, wherein there is no elastic coupling between the electric motor and the driven rotors.

6. The screw compressor according to claim 1, wherein the electric motor is a high-speed motor that can reach a rotational speed of more than 3000 rpm.

7. The screw compressor according to claim 1, wherein a transmission ratio of the driving and driven gears is maximum six.

8. The screw compressor according to claim 7, wherein the synchronisation gear of the first rotor or the synchronisation gear of the second rotor also serves as a driven gear.

9. The screw compressor according to claim 1, wherein in at least one of a synchronisation gear of the first rotor, a synchronisation gear of the second rotor, or the driven gear of said first rotor or said second rotor, a plurality spokes is provided and a plurality of spaces between the spokes are covered.

10. The screw compressor according to claim 1, wherein in the driving gear, at least one region defined within the rim, the gear hub and two adjacent spokes is filled with a damping material.

11. The screw compressor according to claim 1, wherein the area of the region defined within the rim, the gear hub and two adjacent spokes is more than four times the surface area of the spokes as viewed along the axis of the driving gear.

12. The screw compressor according to claim 11, wherein the area of the region defined within the rim, the gear hub and two adjacent spokes is more than five times the surface of the spokes as viewed along the axis of the driving gear.

* * * * *